United States Patent [19]
Schmalhorst et al.

[11] Patent Number: 6,002,554
[45] Date of Patent: Dec. 14, 1999

[54] MULTITRACK COUPLED ELEMENT READ HEAD WITH SUPPORT STRUCTURE TO ELIMINATE SHORTING AND METHOD FOR MANUFACTURING SAME

[75] Inventors: Joseph M. Schmalhorst, Broomfield; Steven C. Herrera, Littleton; Richard W. Crowell, Broomfield; Yi-Shung Chaug, Boulder; Steve Bryant, Broomfield; James C. Cates, Louisville, all of Colo.

[73] Assignee: Storage Technology Corporation, Louisville, Colo.

[21] Appl. No.: 08/943,722

[22] Filed: Oct. 3, 1997

[51] Int. Cl.$^6$ ........................................... G11B 5/39
[52] U.S. Cl. ............................................. 360/113
[58] Field of Search ..................... 360/113, 121, 360/122; 338/32 R; 324/252

[56] References Cited

U.S. PATENT DOCUMENTS

| | | | |
|---|---|---|---|
| 4,012,781 | 3/1977 | Lin | 360/113 |
| 4,589,042 | 5/1986 | Anderson et al. | 360/125 |
| 4,802,043 | 1/1989 | Sato et al. | 360/113 |
| 4,814,918 | 3/1989 | Somers | 360/113 |
| 5,034,838 | 7/1991 | Brock et al. | 360/122 |
| 5,142,768 | 9/1992 | Aboaf et al. | 29/603 |
| 5,203,119 | 4/1993 | Cole | 51/165.77 |
| 5,264,981 | 11/1993 | Campbell et al. | 360/126 |
| 5,270,892 | 12/1993 | Naberhuis | 360/113 |
| 5,296,993 | 3/1994 | Aboaf et al. | 360/126 |
| 5,302,461 | 4/1994 | Anthony | 428/472 |
| 5,648,886 | 7/1997 | Kobayashi et al. | 360/113 |
| 5,678,086 | 10/1997 | Grandola et al. | 360/122 X |
| 5,684,658 | 11/1997 | Shi et al. | 360/113 |

OTHER PUBLICATIONS

F. William Hahn, Jr., Historical Perspective of Tape Head Contours, IBM Corporation, Tucson, Arizona.

Richard Dee and James Cates, Designing write heads for high–density tape, Data Storage, pp. 43–48, Oct. 1996.

Brahim Lekmine, Recording Channel and Data Detection in Magnetic Tape Drives, Proceedings, SPIE–The International Society for Optical Engineering, High Density Data Recording and Retrieval Technologies, Oct. 23–24, 1995, vol. 2604, pp. 176–180.

Richard C. Schneider, Design Methodology for High Density Read Equalization, Proceedings, SPIE–The International Society for Optical Engineering, High Density Data Recording and Retrieval Technologies, Oct. 23–24, 1995, vol. 2604, pp. 200–209.

Priyadarshee et al., Survey of digital transport servo systems, Proceedings, SPIE–The International Society for Optical Engineering, High Density Data Recording and Retrieval Technologies, Oct. 23–24, 1995, vol. 2604, pp. 210–217.

Eric Baugh et al., Head/tape interface, Proceedings, SPIE–The International Society for Optical Engineering, High Density Data Recording and Retrieval Technologies, Oct. 23–24, 1995, vol. 2604, pp. 158–164.

James A. Bain, Recording heads: write heads for high–density magnetic tape, SPIE–The International Society for Optical Engineering, High Density Data Recording and Retrieval Technologies, Oct. 23–24, 1995, vol. 2604, pp. 165–175.

Jim Eaton, Magnetic tape trends and futures, Proceedings, SPIE–The International Society for Optical Engineering, High–Density Data Recording and Retrieval Technologies, Oct. 23–24, 1995, vol. 2604, pp. 146–157.

*Primary Examiner*—William R. Korzuch
*Attorney, Agent, or Firm*—Brooks & Kushman P.C.

[57] ABSTRACT

A multitrack coupled element read head and a method for manufacturing such a read head are provided. The multitrack coupled element read head includes multiple coupled magnetoresistive read elements in a spaced relationship, and a support structure between a pair of coupled read elements, the support structure also being a magnetoresistive material. The read head also includes a closure material bonded on the plurality of coupled read elements and the support structure, where the support structure provides for substantially even pressure on the pair of coupled read elements such that shorting therein is eliminated.

12 Claims, 2 Drawing Sheets

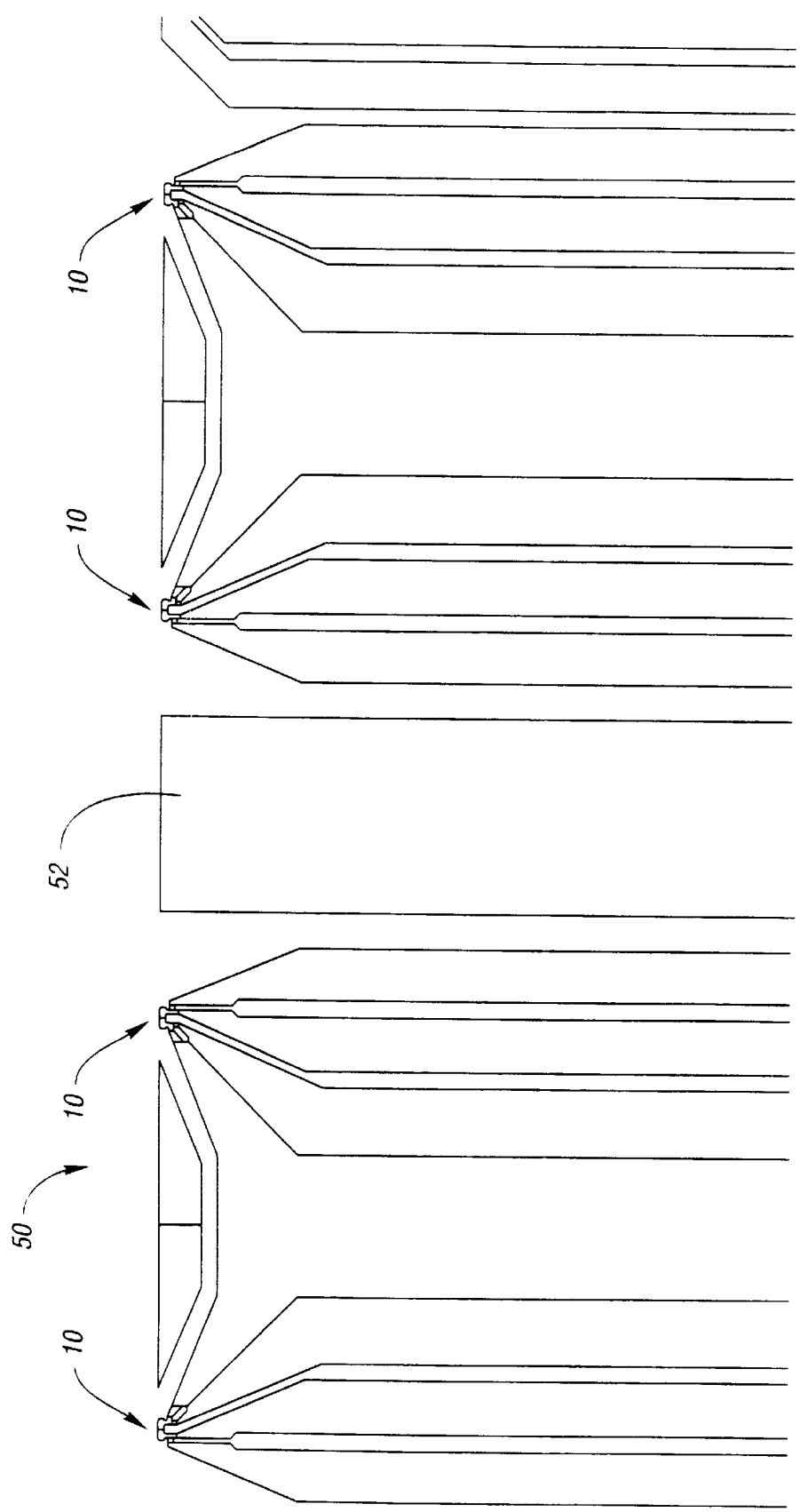

MULTITRACK COUPLED ELEMENT READ HEAD WITH SUPPORT STRUCTURE TO ELIMINATE SHORTING AND METHOD FOR MANUFACTURING SAME

TECHNICAL FIELD

The present invention relates to a thin film multitrack coupled element read head and a method for manufacturing such a read head to eliminate induced shorting.

BACKGROUND ART

There are several ways to fabricate magneto-resistive (MR) sensors for read back of data on magnetic tape. In all cases, a bias method must be used in order to permit the sensor to operate in the linear portion of the MR curve. In some cases, two elements can be used at the same time, reading the same data, to reduce signal distortion by processing the signal differentially so that any nonlinearities arising from the shape of the MR curve are canceled out.

In a coupled element design, the two elements may be placed atop each other in close proximity. This allows the sensors to provide magnetic bias for each other, as well as providing the benefits of differential sensing. The design has an added benefit of high output, since it is essentially two elements occupying the same space that one would under normal circumstances.

One of the difficulties in making coupled element sensors is that for high linear densities, gap lengths must be made very small, and therefore the films making up the MR sensors must be separated by only a very thin insulator. Furthermore, because of the stacked nature of the design, all interconnection metallization must traverse steps where one material ends, and an insulating material tends to thin down.

Additionally, with narrow track widths and line widths, any misalignment of one element to the other, or misalignment of the interconnection leads to either element, can cause shorting. Finally, in current designs, the head is finished by placing a closure piece on top of the film stack, such that the pressure from bonding of the closure piece can bring on shorts where alignment is marginal.

In the multitrack environment, yield is of a paramount concern, as shorted tracks cannot be simply culled out. Instead, if any one sensor is defective, the entire array must be failed. Therefore, there exist a need for a multitrack coupled element read head design and a method for manufacturing such a read head that eliminates any avenues of shorting or discontinuities.

SUMMARY OF THE INVENTION

Accordingly, a principle object of the present invention is to provide an improved multitrack coupled element read head designed to eliminate induced shorting during manufacture.

Another object of the present invention is to provide an improved method for manufacturing such a multitrack coupled element read head.

According to the present invention, then, a method is provided for manufacturing a multitrack coupled element read head. The method comprises providing a plurality of coupled magnetoresistive read elements in a spaced relationship, and providing a support structure between a pair of the plurality of coupled read elements, the support structure comprising a magnetoresistive material. The method also comprises bonding a closure material on the plurality of coupled read elements and the support structure, wherein the support structure provides for substantially even pressure on the pair of the plurality of coupled read element such that shorting in the pair of coupled read elements is eliminated.

The present invention also provides a multitrack coupled element read head. The read head comprises a plurality of coupled magnetoresistive read elements in a spaced relationship, and a support structure between a pair of the plurality of coupled read elements, the support structure comprising a magnetoresistive material. The read head also comprises a closure material bonded on the plurality of coupled read elements and the support structure, wherein the support structure provides for substantially even pressure on the pair of the plurality of coupled read element such that shorting in the pair of coupled read elements is eliminated.

These and other objects, features and advantages will be readily apparent upon consideration of the following detailed description in conjunction with the accompanying drawings.

BRIEF DESCRIPTION OF THE DRAWINGS

FIG. 3 is a top plan view of the multitrack coupled element read head of the present invention manufactured according to the method of the present invention.

DETAILED DESCRIPTION OF THE INVENTION

Figure 1:
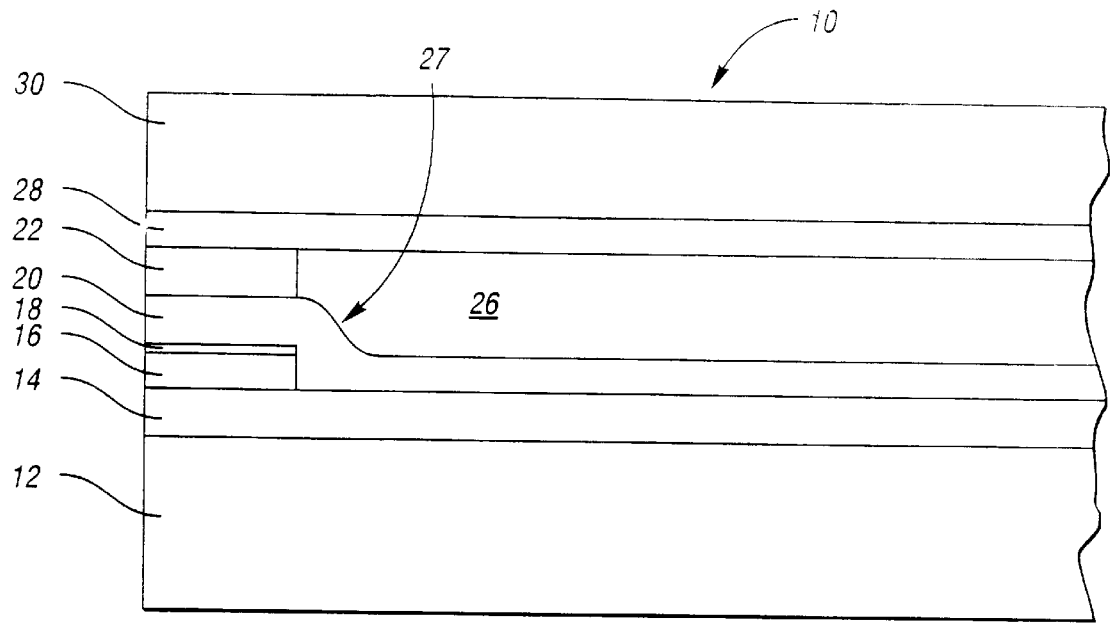
FIG. 1 is a cross-sectional view of one coupled element of the multitrack coupled element read head of the present invention manufactured according to the method of the present invention.
Figure 2:
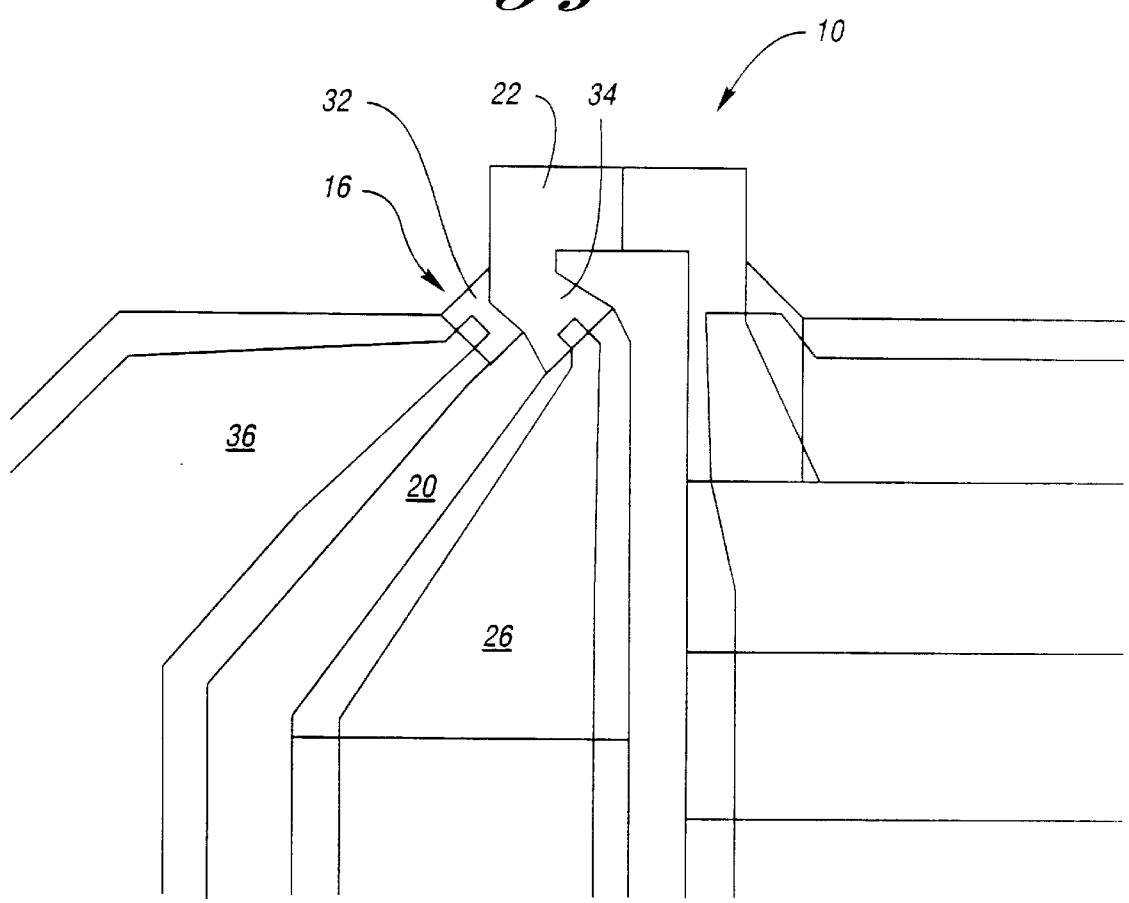
FIG. 2 is top plan view of the coupled element of the multitrack coupled element read head shown in FIG. 1.

Referring now to FIGS. 1–3, the preferred embodiment of the present invention will now be described in detail. In that regard, FIG. 1 shows a cross-sectional view of one coupled element (10) of the multitrack coupled element read head of the present invention manufactured according to the method of the present invention.

As seen therein, coupled element (10) includes a substrate (12) having an insulative layer (14) deposited thereon. Substrate (12) is preferably a magnetic material such as Ferrite. Insulative layer (14) is preferably aluminum oxide or other similar material, such as silicon-nitride, known in the art for use as an insulative layer in thin film recording heads.

Coupled element (10) also includes a sensor element (16) formed on insulative layer (14). Sensor element (16) comprises a magnetoresistive (MR) material and functions as part of a read element. MR sensor element (16) is formed according to known photolithographic processes including deposition and etching of a known MR material, which may be a nickel-iron alloy such as permalloy. As will be described in greater detail below, MR sensor element (16) preferably has an electrochemically anodized material (18) such as titanium deposited thereon.

Coupled element (10) still further includes another insulative layer (20), preferably aluminum oxide or silicon-nitride, deposited on anodized layer (18) of MR sensor element (16) and on insulative layer (14). A second sensor element (22) is then formed on insulative layer (20). As with MR sensor element (16), sensor element (22) comprises a magnetoresistive (MR) material and functions as part of a read element. In that regard, first and second MR sensor elements (16, 22) together form a coupled element. Once again, MR sensor element (22) is formed according to known photolithographic processes including deposition and etching of a known MR material, which may be a nickel-iron alloy such as permalloy.

As previously described, anodized layer (18) is disposed between MR sensor element (16) and insulative layer (20). The material of anodized layer (18), such as titanium, tantalum or other similar metal, is used to help insulate between MR sensor elements (16, 22), preventing occasional pinholes in the sputter deposited insulative layer (20) from causing element-to-element shorts between MR sensor elements (16, 22). It should be noted that an additional layer (not shown) of electrochemically anodized material may be used between insulative layer (20) and MR sensor element (22). As is readily apparent, like anodized layer (18), such a layer would also help to prevent element-to-element shorts between MR sensor elements (16, 22).

Coupled element (10) still further includes a metallized interconnecting lead (26), which is preferably gold, but may be copper or a similar conductor, and which is also formed by conventional photolithographic processes. Interconnecting lead (26) functions as a conductor of current to or from MR sensor element (22). In that regard, while not visible in this cross-sectional view, MR element (16) is also provided with such an interconnecting lead. Such interconnecting leads, which are thicker than the MR sensor elements (16, 22) themselves, are used to make any steps (27) over patterned MR layers. This eliminates any discontinuities that might be produced by having one MR sensor element (22) step down where the other MR sensor element (16) is patterned, since MR sensor elements (16, 22) are of like thickness.

A final insulative layer (28), again prefera bly aluminum oxide or silicon-nitride, is deposited on MR sensor element (22) and interconnecting lead (26). To complete coupled element (10), a closure piece (30) is bonded to insulative layer (28). Closure piece (30) is preferably a magnetic material such as Ferrite. It should be noted, however, that non-magnetic materials such as an aluminum-titanium-carbide (AlTiC) alloy, or other similar hard material known in the art, may also be used for substrate (12) and/or closure piece (30) provided thin-film shields are placed on either side of the magnetic gap (i.e., below insulative layer (14) and above insulative layer (28)). Such shield layers are deposited and patterned using standard processing techniques well known in the art. As will be described in greater detail below, the pressure used to ensure that closure piece (30) is adequately bonded to MR sensor element (22) and interconnecting lead (26) can also cause element-to-element shorting between MR sensor elements (16, 22).

Referring now to FIG. 2, a top plan view of the coupled element (10) of the multitrack coupled element read head of FIG. 1 is shown, prior to the bonding of closure piece (30) of FIG. 1 thereon. As seen therein, MR sensor element (22) is disposed over and substantially covering MR sensor element (16), separated by insulative layer (20). MR sensor elements (16, 22) each include a leg section (32, 34), respectively, which function as connection points for interconnect leads (36, 26), respectively. Moreover, the contact leg (34) of MR sensor element (22) is also provided with a flared shape. As a result, even if interconnecting lead (26) is misaligned during fabrication thereof, interconnecting lead (26) will not contact MR sensor element (16).

Referring finally to FIG. 3, a top plan view of the multitrack coupled element read head (50) of the present invention manufactured according to the method of the present invention is shown, prior to the bonding of closure piece (30) of FIG. 1 thereon. As seen therein, read head (50) includes a plurality of coupled elements (10) disposed in a spaced relationship to each other. In that regard, each coupled element (10) provides one track of multitrack coupled element read head (50).

As previously described, the pressure used to ensure that closure piece (30) of FIG. 1 is adequately bonded to coupled elements (10) of read head (50) can cause element-to-element shorting between the coupled elements (i.e., MR sensor elements (16, 22) of FIG. 2).

To prevent such shorting, support structures (52) of MR material are added in the spaces between coupled elements (10), providing for more evenly distributed pressure on coupled elements (10) as the closure piece is bonded to the chip. This, in turn, eliminates shorting induced by extrusion of interconnect material into those areas where such interconnect material should not be present.

As is readily apparent from the foregoing description, then, the present invention provides an improved multitrack coupled element read head, and a method for manufacturing such a read head. More specifically, the read head and the method for manufacturing the read head of the present invention provide a structure that serves to eliminate induced shorting during construction.

It should be noted, however, that the present invention is not limited to use in tape storage systems. In that regard, the multitrack thin film coupled element read head and method for manufacturing such a read head of the present invention are also suitable for use in disk storage systems where single or multitrack heads are desired.

It is to be understood, then, that the present invention has been described in a illustrative manner and that the terminology which has been used is intended to be in the nature of words of description rather than of limitation. As previously stated, many modification and variations of the present invention are possible in light of the above teachings. Therefore, it is also to be understood that, within the scope of the following claims, the present invention may be practiced otherwise than as specifically described.

What is claimed is:

1. A method for manufacturing a multitrack coupled element read head, the method comprising:
   providing a plurality of coupled magnetoresistive read elements in a spaced relationship, including
      depositing a first magnetoresistive material on a first insulative layer, the first magnetoresistive material forming a first read element,
      depositing an electrochemically anodized material on the first read element,
      depositing a second insulative layer on the anodized material, and
      depositing a second magnetoresistive material on the second insulative layer, the second magnetoresistive material forming a second read element substantially overlaying the first read element, the electrochemically anodized material eliminating shorting between the first and second read elements, the first and second read elements forming a coupled read element;
   providing a support structure between and separated from a pair of the plurality of coupled read elements, the support structure comprising a magnetoresistive material; and
   bonding a closure material on the plurality of coupled read elements and the support structure, wherein the support structure provides for substantially even pressure on the pair of the plurality of coupled read elements such that shorting in the pair of coupled read elements is eliminated.

2. The method of claim 1 wherein the electrochemically anodized material comprises titanium or tantalum.

3. A multitrack coupled element read head manufactured according to the method of claim 2.

4. The method of claim 1 further comprising:

depositing a first conductive material in contact with the first read element, the first conductive material forming a first current interconnect lead for the first read element, the first current interconnect lead having a sufficient thickness so that the first read element may be provided with a substantially uniform thickness; and depositing a second conductive material in contact with the second read element, the second conductive material forming a second current interconnect lead for the second read element, the second current interconnect lead having a sufficient thickness so that the second read element may be provided with a substantially uniform thickness;

wherein the substantially uniform thicknesses of the first and second read elements substantially eliminate discontinuities between signals therefrom.

5. A multitrack coupled element read head manufactured according to the method of claim 4.

6. The method of claim 4 further comprising providing the second read element with an integral leg for contact with the second current interconnect lead, wherein the integral leg is disposed such that the second current interconnect lead is prevented from establishing contact with the first read element during alignment of the second current interconnect lead to the second read element.

7. A multitrack coupled element read head manufactured according to the method of claim 6.

8. A multitrack coupled element read head manufactured according to the method of claim 1.

9. A multitrack coupled element read head comprising:

a plurality of coupled magnetoresistive read elements in a spaced relationship, including a first magnetoresistive material deposited on a first insulative layer, the first magnetoresistive material forming a first read element, an electrochemically anodized material deposited on the first read element, a second insulative layer deposited on the anodized material, and a second magnetoresistive material deposited on the second insulative layer, the second magnetoresistive material forming a second read element substantially overlaying the first read element, the electrochemically anodized material eliminating shorting between the first and second read elements, the first and second read elements forming a coupled read element;

a support structure between and separated from a pair of the plurality of coupled read elements, the support structure comprising a magnetoresistive material; and a closure material bonded on the plurality of coupled read elements and the support structure, wherein the support structure provides for substantially even pressure on the pair of the plurality of coupled read elements such that shorting in the pair of coupled read elements is eliminated.

10. The read head of claim 9 wherein the electrochemically anodized material comprises titanium or tantalum.

11. The read head of claim 9 further comprising:

a first conductive material deposited in contact with the first read element, the first conductive material forming a first current interconnect lead for the first read element, the first current interconnect lead having a sufficient thickness so that the first read element may be provided with a substantially uniform thickness; and a second conductive material deposited in contact with the second read element, the second conductive material forming a second current interconnect lead for the second read element, the second current interconnect lead having a sufficient thickness so that the second read element may be provided with a substantially uniform thickness;

wherein the substantially uniform thicknesses of the first and second read elements substantially eliminate discontinuities between signals therefrom.

12. The read head of claim 11 wherein the second read element includes an integral leg for contact with the second current interconnect lead, the integral leg being disposed such that the second current interconnect lead is prevented from establishing contact with the first read element during alignment of the second current interconnect lead to the second read element.

* * * * *